May 28, 1968
D. R. WHITEMAN
3,385,549
KING PIN TIE-DOWN ADAPTER
Filed Aug. 1, 1966
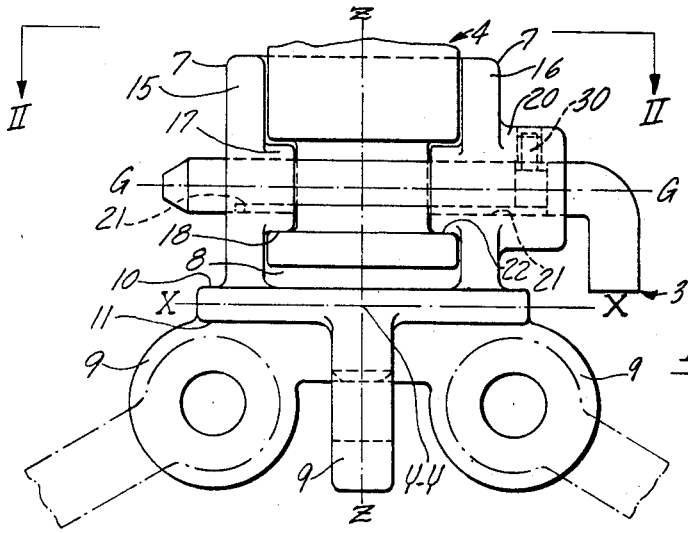
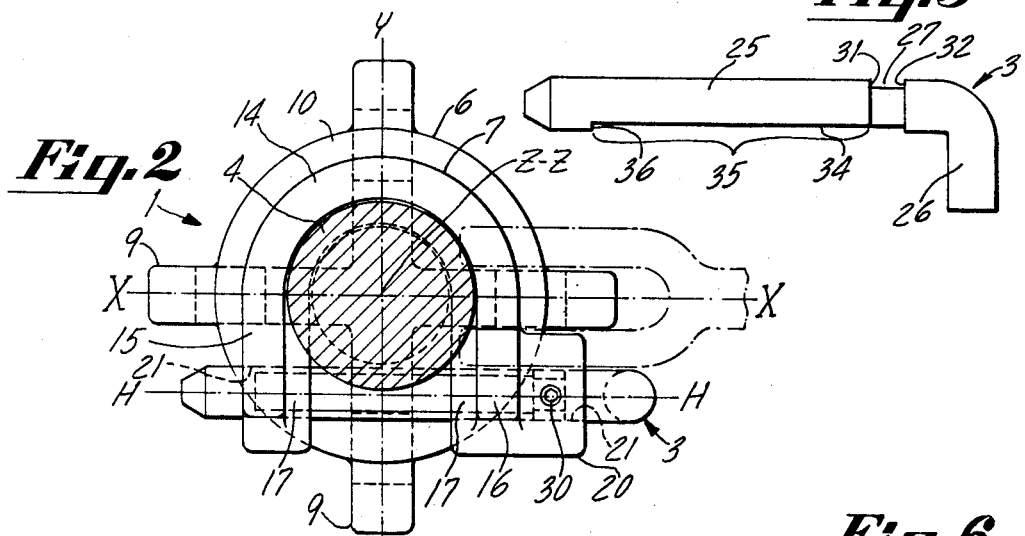
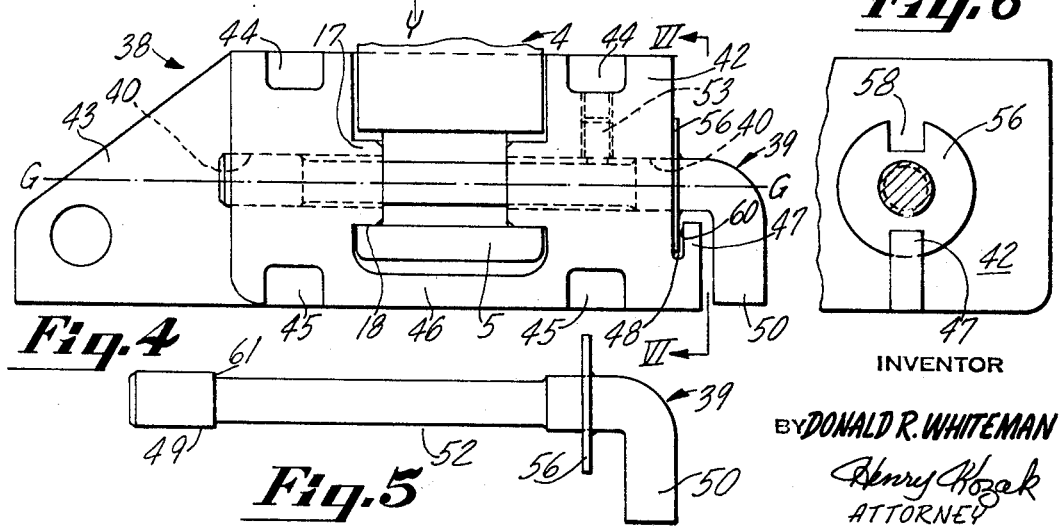
INVENTOR
BY DONALD R. WHITEMAN
Henry Kozak
ATTORNEY _United States Patent Office_

3,385,549
Patented May 28, 1968

3,385,549
KING PIN TIE-DOWN ADAPTER
Donald R. Whiteman, Mentor, Ohio, assignor to Midland-Ross Corporation, Cleveland, Ohio, a corporation of Ohio
Filed Aug. 1, 1966, Ser. No. 569,346
9 Claims. (Cl. 248—361)

ABSTRACT OF THE DISCLOSURE

A tie-down adapter removably coupled to a king pin of a trailer for use in securing the front end of the trailer to a support.

In marine and railway transportation, various methods are used for securing a highway trailer to a support, such as the deck of a ship or the floor of a railway car. In the securement of the trailer to the support, recent improvements in trailer construction in the king pin area have permitted increased use of the king pin in lashing piggy-back trailers to railway cars.

It is the primary object of this invention to provide a king pin tie-down adapter for tying the front end of a trailer, through a spray-lashing system, down to a support to secure the trailer against any movement in response to vertical, fore and aft, and lateral forces imposed upon the trailer.

A further object is to provide a tie-down adapter having a self-contained locking mechanism adjusting it for quick detachment from the king-pin.

Summary of the invention

Briefly, the invention encompasses a tie-down adapter that is removably coupled to a trailer king pin having an end collar. The adapter comprises a base plate having a U-shaped wall extending upwardly therefrom to provide a pocket having an opening at one end for laterally receiving the trailer king pin. A rib projects from the inner contour of the wall into the pocket to provide a U-shaped shoulder for mating engagement with the collar to thereby mountably support the adapter on the king pin. To secure the adapter to the king pin, the adapter carries a self-contained locking mechanism comprising a locking pin that is supportably received by the U-shaped wall and which bridges the open end of the wall in the locked position of the pin. Finally, to secure the front end of the trailer to a support, through the use of a spray-lashing system, the adapter has a plurality of lashing lugs which extend radially downwardly and outwardly from the base plate.

Description of the drawings

In the drawing in respect to which this invention is described:

FIG. 1 is an elevational view of a tie-down adapter removably coupled to a trailer king pin.

FIG. 2 is a top view of the tie-down adapter of FIG. 1, with the king pin shown in cross-section, taken along line II—II of FIG. 1.

FIG. 3 is a view of the locking pin shown in FIGS. 1 and 2.

FIG. 4 is an elevational view of a modified tie-down adapter.

FIG. 5 is a view of a modified locking pin employed in the modification shown in FIG. 4.

FIG. 6 is a partial side elevation, taken along lines VI—VI of FIG. 4, illustrating the position of the locking pin in locked position.

Description of the embodiments

Specific reference is now made to the drawings wherein similar reference characters are used for corresponding elements in both embodiments.

FIGS. 1 and 2 illustrate a preferred embodiment of the invention wherein a tie-down adapter 1 is interlocked by a locking pin 3 to a trailer king pin 4 having an end collar 5. The tie-down adapter comprises a base plate 6, an integrated U-shaped wall 7 extending upwardly from the base plate to define a pocket 8 for receiving king pin 4, and a plurality of lashing lugs 9 depending radially outwardly from the plate 6. Plate 6 is preferably circular and has a top surface 10, and an undersurface 11 with longitudinal and transverse axes X—X and Y—Y, respectively, contained in the general horizontal plane of the plate. A vertical axis Z—Z transversely intersects the X—X and Y—Y axes.

The U-shaped wall 7 comprises a semi-cylindrical portion 14 concentrically arranged about the Z—Z axis and a pair of wall segments 15, 16 disposed in parallel equidistant relationship from a vertical plane extending through the Y—Y and Z—Z axes. A rib 17 extends along a general horizontal plane G—G and is spaced above the top surface 10 of the plate. This rib projects from the inner contour of the wall 7 into the pocket 8, and thus provides a shoulder 18 for engaging the king pin collar 5 when the king pin is disposed in the pocket 8 in coaxial alignment with the Z—Z axis.

Projecting from the outer contour of the end of wall segment 16 of the wall 7 in the plane G—G is a boss 20. Extending through the boss 20 and wall 7 is a pair of coaxial holes 21—21 whose axis H—H is positioned from the Z—Z axis in spaced parallel relation with the X—X axis, a distance that is substantially equal to the radius of the inner contour of the semi-cylindrical portion 14.

To secure the adapter to the king pin, the removable locking pin 3 is mounted within the holes 21—21 to thereby define a means that bridges the open end of the pocket 8 in overlying relation with the shoulder 5a of the king pin collar 5.

As illustrated in FIG. 3, the pin 3 comprises a shaft 25 having a handle 26 at one end. The shaft is provided with an annular groove 27 near handle 26 for receiving the end of an adjustable key 30 in the form of a set-screw disposed in a threaded aperture in the boss 20 in radial relation to the axis of the pin 3. The annular groove 27 provides a pair of opposed shoulders 31 and 32 for engagement with the end of key 30 to thus function as a stop means to limit the axial movement of the pin 3 in either direction from its locked position.

To permit the pin 3 to be moved axially in its mounted position, the shaft 25 has a downwardly-facing flat surface 34 disposed intermediate its ends within the cylindrical contour of the pin. Surface 34 is of a predetermined length and defines a keyway 35 for the key 30. The keyway 35 extends to shoulder 31 of groove 27. Since the end of the key 30 is of a dimension less than the keyway opening, the pin 3 may be moved lengthwise of its axis when the key is in registry with the keyway to thereby define a locked and unlocked position of the pin.

As shown in FIG. 1, pin 3 locks the adapter 1 to the king pin 4 when the pin is in its position furthest to the left, with the handle 26 resting downwardly and the key 30 occupying the groove 27. To disengage the pin 3 from the king pin and place it in the unlocked position, the pin is rotated in either direction until the handle points straight upward. With the handle in upward position, the pin may be moved toward the right since the key 30 is then in alignment with the keyway 35.

When in unlocked position, the pin is prevented from being removed completely from the adapter 1 by a shoulder 36 that is located at the other end of the keyway 35. Engagement between shoulder 36 and key 30 precludes removal of the pin from the adapter.

FIGURES 4, 5, and 6 illustrate another embodiment of the invention. In this arrangement, a tie-down adapter 38 is interlocked to the trailer king pin 4 by a locking pin 39 that is mounted within holes 40—40 in the adapter. Adapter 38 comprises, e.g., a casting 42 formed with a U-shaped wall having a semi-cylindrical portion and a pair of parallel wall segments similar in plan view to the tie-down adapter 1 shown in FIG. 2. The casting 42 has a plurality of lashing lugs 42 extending radially outwardly therefrom for securing the adapter, through a spray lashing system, to a support. The casting has a pair of lightening recesses 44 and 45 in the top and bottom thereof for weight reduction. The base of the casting is defined by a bottom wall 46. Similar to the adapter shown in FIG. 1, adapter 38 comprises the rib 17 having the shoulder 18 for engagement with the king pin collar 5. A key lug 47 projects from the outer contour of the adapter 38 near the end of one of the wall segments of the casting 42. The upper end of the key lug 47 is spaced radially from the axis of the pin 39 and horizontally from the outer contour of the casting 42 to define a narrow notch 48. The function of the lug 47 is to cooperate with the locking pin 39 so as to prevent the axial movement of the pin from a locked to an unlocked position, as will be hereinafter explained.

As illustrated in FIG. 5, the locking pin comprises a shaft 49, a handle 50 at one end, and a circular vertically disposed flange 56. The shaft 49 is provided intermediate its ends with an annular groove or keyway 52 of predetermined length for slidably receiving the end of an adjustable key 53. Key 53 is adjustably disposed in the casting 42 in a manner similar to that of key 30 in boss 20 of the adapter shown in FIG. 1. Flange 56 is secured, as by welding, to the shaft 49 intermediate the groove 52 and the handle 50. The outer radius of the flange 56, as measured from the axis of the pin, is of a dimension greater than the distance to the upper end of lug 47, but less than the distance to the base of notch 48. The thickness of the flange is less than that of the notch 48 to permit the flange to be received within the notch. A keyway opening 58 is provided in the periphery of the flange 56 to permit passage of the lug 47 therethrough in moving the pin 39 lengthwise of its axis to a position for releasing the king pin 4 from the adapter 38. The opening 58 is disposed on the opposite side of the axis of shaft 49 from the handle 50.

When the pin is in the locked position, as shown in FIG. 4, flange 56 limits the movement of the pin 39 towards the casting 42 by engagement with the outer contour of the casting. In this position of the pin, lug 47 is in a radially overlapping relation with the flange 56, and an inner surface 60 of the lug 47 cooperates with the flange to restrict the movement of the pin away from the casting. To disengage the pin 39 from the king pin 4, the handle 50 is rotated 180 degrees to a vertical position to place keyway opening 58 in alignment with the lug 47. The pin may then be moved axially away from the casting 42 to its unlocked position in which a shoulder 61 of the groove 52 engages key 53 to prevent the complete withdrawal of the pin from the adapter.

The invention as disclosed hereinabove provides a simple and convenient tie-down device for rapid securement of the front end of a highway trailer to a support through the use of an adjustable spray lashing system.

The terms and expressions which have been employed are used as terms of description and not of limitation and there is no intention of excluding such equivalents as fall within the scope of the claims.

What is claimed is:

1. A unitary tie-down adapter for mounting on a trailer king pin and adapted for use in securing the front end of a highway trailer to a support, said king pin having an end collar, said adapter comprising:
   (A) a base plate having an integral upwardly extending wall of generally U-shaped configuration defining a pocket having an opening at one end for laterally receiving the king pin, said wall having a rib projecting from its inner contour into said pocket, said rib providing a downwardly facing U-shaped shoulder for engaging the king pin collar to mountably support the adapter on the king pin;
   (B) a plurality of lashing lugs on said plate; and
   (C) a self-contained locking mechanism for quick detachment of the adapter from the king pin, said mechanism comprising a locking pin having a shaft portion supportably received in said wall for rotative and axial movement relative to said wall, said locking pin being movable axially from a normally locked position to an unlocked position, said shaft portion in the locked position of the pin bridging the open end of said wall in the plane of the rib and being in overlying relation with the king pin collar to secure said adapter to said king pin.

2. A tie-down adapter in accordance with claim 1 wherein:
   (A) said shaft portion defines an axially extending keyway of predetermined length traversing the open end of said pocket in the locked position of the pin; and
   (B) key means on said adapter adapted to be received in said keyway upon rotation of said pin from its normally locked position to permit lengthwise movement of said locking pin from the locked to the unlocked position.

3. A tie-down adapter in accordance with claim 1 wherein:
   (A) said locking pin has a handle at one end of said shaft portion; and
   (B) the adapter has locking means for preventing undesired axial movement of said pin from a locked to an unlocked position, said locking means comprising stop means on said shaft portion and abutment means carried by the adapter for engaging said stop means.

4. A tie-down adapter in accordance with claim 3 wherein:
   (A) said stop means includes an annular groove in said shaft portion; and
   (B) said abutment means comprises an adjustable key projecting into said groove.

5. A tie-down adapter in accordance with claim 3 wherein:
   (A) said stop means comprises a circular flange on said shaft portion adjacent said handle; and
   (B) said abutment means comprises a lug in radially overlapping relation with said flange for engagement therewith.

6. A tie-down adapter in accordance with claim 2 wherein:
   (A) said locking pin has a handle at one end of said shaft portion; and
   (B) keyway stop means on said shaft portion at the other end thereof adapted to cooperate with said key means upon axial movement of said pin to positively limit the axial movement of the pin and define its unlocked position.

7. A tie-down adapter in accordance with claim 3 wherein:

(A) said shaft portion is of reduced diameter intermediate its ends to provide an annular groove on said shaft; and (B) an adjustable key is provided on said adapter projecting into said groove, said adjustable key cooperating with a shoulder defined by the groove to define the unlocked position of said locking pin.

8. A tie-down adapter in accordance with claim 4 wherein:

(A) said groove has a shoulder facing the other end of the shaft for engagement with said abutment means so as to limit the axial movement of said pin from the unlocked position to the locked position.

9. A tie-down adapter in accordance with claim 3 wherein:

(A) said stop means engages an outer contour of the wall to limit the axial movement of said pin from the unlocked position to the locked position.

References Cited

UNITED STATES PATENTS

| | | | |
|---|---|---|---|
| 2,925,286 | 2/1960 | Hodges et al. | 280—434 |
| 3,000,654 | 9/1961 | Keener | 280—433 |
| 3,143,083 | 8/1964 | Gutridge et al. | 248—119 X |
| 3,250,506 | 5/1966 | Thouvenelle et al. | 248—119 |

ROY D. FRAZIER, *Primary Examiner.*

FRANK DOMOTOR, *Assistant Examiner.*